United States Patent [19]

Starke et al.

[11] Patent Number: 5,174,509
[45] Date of Patent: Dec. 29, 1992

[54] INCINERATED WASTE MATERIAL TREATMENT

[75] Inventors: George O. Starke; James R. Diefenthal, both of New Orleans, La.; Peter F. Prinz, Pinellas Park, Fla.

[73] Assignee: Resource Recycling, Inc., Pinellas Park, Fla.

[21] Appl. No.: 718,787

[22] Filed: Jun. 21, 1991

[51] Int. Cl.$^5$ ............................................. B02C 23/00
[52] U.S. Cl. ...................................... 241/24; 241/29; 241/DIG. 38
[58] Field of Search ................ 241/24, DIG. 38, 29

[56] References Cited

U.S. PATENT DOCUMENTS

| | | | |
|---|---|---|---|
| 3,524,594 | 8/1970 | Anderson et al. | 241/79.1 X |
| 3,790,091 | 2/1974 | Law et al. | 241/79 X |
| 3,817,458 | 6/1974 | Gilberto | 241/79.1 X |
| 4,113,185 | 9/1978 | Marsh et al. | 241/DIG. 38 X |
| 4,662,570 | 5/1978 | Heeren et al. | 241/79.1 |
| 4,815,667 | 3/1989 | Keller | 241/79.1 X |
| 5,067,659 | 11/1991 | Heeren et al. | 241/24 X |

Primary Examiner—Mark Rosenbaum
Assistant Examiner—Frances Chin
Attorney, Agent, or Firm—William David Kiesel; Robert C. Tucker

[57] ABSTRACT

Apparatus and processes for treating an incinerated waste material feedstock to obtain a "free-from-ash" ferrous metal product are disclosed which provide for early separation of the initial feedstock into a predominately ash stream and predominately ferrous metal stream by a two step separation based on size of the material and use of dual trommels or special bar screens and dual magnet arrangements.

16 Claims, 1 Drawing Sheet

INCINERATED WASTE MATERIAL TREATMENT

BACKGROUND OF THE INVENTION

1. Field of the Invention

This invention relates in general to processes for treating incinerated waste products and the like, and more particularly, to treating incinerated municipal waste material to obtain "free-from-ash" ferrous metal, non-ferrous metals and metal-free ash as separate products of the process.

2. Prior Art

The increase in the volume and variety of solid waste products requiring disposal by both private and public sectors has grown dramatically. Such solid waste products have in the past been burned in mass burn or RDF incinerators. However, due to current environmental laws and regulations, incineration of solid waste has been restricted to a significant extent in many geographical areas, and in fact is prohibited in many areas today.

Disposal and burial of solid waste products in sanitary landfills is a frequently used alternative disposal method. But even this method is becoming non-acceptable in many geographical areas either because many existing landfills are reaching their capacity and additional replacement clean landfills have not been approved by regulatory agencies and authorities due to existing environmental laws and regulations and due to an actual shortage of land in some geographic areas.

Recovery of salvageable and recyclable metals, of course, reduces the amount of waste products that must be disposed. In addition any monies received for the recovered metals, particularly "free-from-ash" ferrous metals, may reduce the overall cost of treating the solid waste products. Most salvage methods involve pre-incineration separation of materials in the solid waste product, or after incineration separation of the unburnt carboneous material from the recyclable metals and other material, or combination of these methods. Examples of the first method are disclosed in U.S. Pat. Nos. 3,524,594, 3,790,091 and 3,817,458, and examples of the other methods are disclosed in U.S. Pat. Nos. 4,662,570 and 4,815,667.

The treatment of incinerated waste products, particularly municipal waste products, presents numerous treatment problems. One significant problem is the diversity of the feedstock. It may include unburnt tree stumps, washing machines, metal bars, wire, rocks, etc., all in various shapes and sizes, as well as significant quantities of ash. This diversity requires that the equipment be designed to handle this variety of materials.

Another significant problem is the abrasive characteristic of much of the incinerated waste material. This abrasiveness can wear out certain pieces of equipment in just hours or days. The resulting shut down time and equipment replacement cost can make a particular method uneconomical.

Still another problem is the moisture content of the incinerated waste material which makes the material tacky, particularly the wet ash. This tackiness can cause clogging or blinding problems with the equipment.

A further problem is plugging or jamming of equipment which can occur because of wire and similar material in the incinerated waste material.

All of these problems are particularly acute in the various screening devices typically used in such processes.

There are also in many cases the requirement that the process be designed so that the equipment can be positioned in restricted spaces, yet capable of handling enormous throughput of incinerated waste material.

Still another problem with existing processes when recovering "free-from-ash" ferrous metal from incinerated waste feedstock is the lack of consistent quality of the recovered ferrous metal. In most cases the ash content of the recovered ferrous metal is too high for the ferrous metal to be used in steel production and similar processes. Thus it must be sold at a much lower price as a low grade ferrous metal.

Another significant problem results from the combination of the large quantity of incinerated waste material that must be treated and the high percentage of ash material contained in the incinerated waste material. Prior treating processes do not efficiently separate the material being treated to reduce the time and wear on the processing equipment.

OBJECTS AND SUMMARY OF THE INVENTION

Therefore one object of this invention is to provide methods of processing incinerated waste material of diverse characteristics.

Another object of this invention is to provide methods of processing incinerated waste material that can withstand the abrasive character of the material, particularly the ash particles contained in the incinerated waste material.

Still another object of this invention is to provide methods of processing incinerated waste material in large quantities and in restricted space.

A still further object of this invention is to provide methods of processing incinerated waste material which will substantially reduce down time resulting from the tackiness of the material or its tendency to clog, blind or jam the equipment.

A further object of this invention is to provide methods of processing incinerated waste material which allows recovery of "free from ash" ferrous metal.

Another object of this invention is to provide methods of processing incinerated waste material which results in efficiently separate the material being treated to reduce the time and wear on the processing equipment.

Other objects and advantages of the invention will become apparent from the ensuing descriptions of the invention.

Accordingly, a method for treating a feedstock of incinerated waste material containing ferrous metals, non-ferrous metals and ash to produce a "free-from-ash" ferrous metal product comprising: separating said feedstock to form a first stream whose components each have dimensions which are less than a first pre-determined size, and a second stream whose components each have dimensions which are greater than said first pre-determined size; conveying said first stream to a sizing means to form a third stream whose components each have dimensions which are greater than a second pre-determined size, said second pre-determined size being less than said first pre-determined size, and a fourth stream whose components each have dimensions which are less than said second pre-determined size; conveying said third stream to said second stream; removing ferrous metal from said fourth stream to form a first ferrous metal stream, and a fifth stream; conveying said first ferrous metal stream to said second stream;

separating said fifth stream to form a an eighth stream whose components each have dimensions which are less than a fourth pre-determined size and are comprised substantially of ash, said fourth pre-determined size being less than said second pre-determined size, and a tenth stream whose components each have dimensions which are greater than said third pre-determined size and less than said first pre-determined size; reducing said dimensions of said components in said ninth stream to form an tenth stream whose components each have dimensions which are less than a fifth pre-determined size, said fifth pre-determined size being less than said first pre-determined size, but greater than said third pre-determined size; removing any ferrous metal from said tenth stream to form an eleventh stream comprising non-ferrous metals and ash; reducing said dimensions of said components in said second stream, said third stream and said first ferrous metal stream to form a sixth stream whose components each have dimensions less than a third pre-determined size, said third pre-determined size being less than said first pre-determined size; removing ferrous metal from said sixth stream to form a seventh stream comprising substantially non-ferrous metal and ash; conveying said seventh stream to said fifth stream; and separating ash from the ferrous metal removed from said sixth stream to form the "free-from-ash" ferrous metal stream.

PREFERRED EMBODIMENTS OF THE INVENTION

Figure 1:
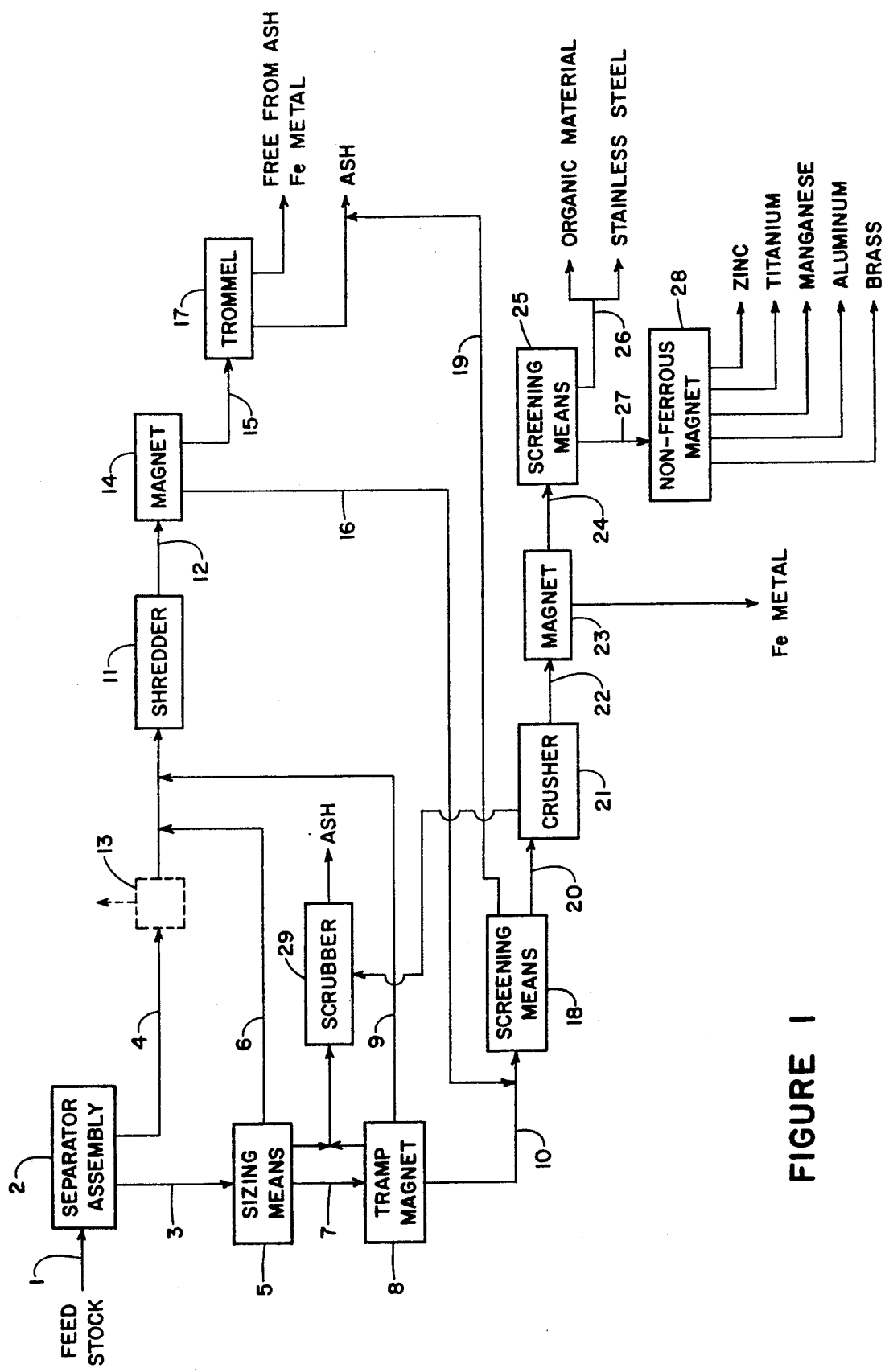
FIG. 1 is a schematic flow diagram of a preferred embodiment of the process for treating incinerated waste material in accordance with a preferred embodiment of this invention.

The preferred embodiments of the invention shall be described utilizing incinerated municipal waste as the feedstock, however, it is to be understood that the apparatus and processes of this invention are equally useful for other waste product feedstocks such as might be encountered in various industrial processes.

In a typical municipal waste-to-energy plant the waste products will be brought to a central collection plant and stored for a short period of time before it is incinerated. There is generally little or no pre-sortment of the waste material prior to incineration. However, in some cases recyclable paper, small tin containers and plastic and glass bottles may be removed prior to incineration. There is no attempt to remove the moisture content from the waste material other than what might drain out during the short storage period before incineration.

Thus, typical municipal waste to be incinerated will include a variety of wood products, other organic products, ferrous and non-ferrous metal products of all shapes and sizes. In a modern incineration plant these products are carried to a large furnace where they are burned at 1400°–2000° F. to produce electricity which is then sold to defray some of the cost of incineration. Enormous quantity of ash, as well as unburned metal and some organic products are the by-products of this incineration. The amount of moisture content in these incineration by-products can vary, but may be up to 40% by the time they are presented for further processing. It is the treatment of these incinerated by-products that the preferred embodiments of this invention are directed. More particularly the preferred embodiments of this invention describe a process wherein the incinerated waste material is separated to produce a "free-from-ash" ferrous material, a clean non-ferrous material, and a clean, metal-free ash material which is less than ⅜ inch in any dimension. Because such ash material can be economically used in the manufacturing of concrete blocks, all of the incinerated waste material processed can be recycled and not be required to be used as landfill.

"Free-from-ash" ferrous material means ferrous metal which has the inherent ash content reduced to less than 1.0% of total content by weight.

Referring now to FIG. 1, the incinerated waste material feedstock 1 is transferred to a separator assembly 2 which is constructed to separate the feedstock into two streams based on a first pre-determined size of the material in the feedstock. It has been found that a substantial portion of the ferrous metal-containing components of the feedstock can be quickly separated from a substantial portion of the ash components of the feedstock by this initial size separation. In addition by proper sizing the feedstock is split into two streams of desired quantity to allow efficient flow though the process for the particular equipment be utilized. Further by proper sizing it is possible to minimize the amount of ash that flows through most of the process equipment in order to minimize the wear on the equipment from the abrasive characteristic of the ash. Although the size can vary depending upon the makeup of the feedstock, for incinerated municipal waste feedstock it is preferred that the size be six inches. Thus, in a preferred embodiment of this invention a first stream 3 containing material having dimensions less than six inches which is by weight predominately ash and non-ferrous metals and a second stream 4 containing material having dimensions greater than six inches which is by weight predominately ferrous metal material are formed.

There are many type of separating apparatus available to separate the initial feedstock; however, when the plant site is of limited area, it is preferred that the separating assembly comprise a support structure having a top deck to receive the feedstock capable of being vibrated, most preferably by a double mount, high frequency motor vibrator. Separating apparatus such as that shown in co-pending U.S. patent application Ser. No. 07/720,220, entitled "Apparatus for separating Incinerated Waste Products" and filed on Jun. 21, 1991 by Peter F. Prinz, one of the co-inventors are particularly preferred.

First stream 3 is transferred by conveyor, or such other similar conventional means, to a sizing means 5 whereby first stream 3 will be divided in accordance with a second pre-determined size less than the first pre-determined size into a third stream 6. For incinerated municipal waste it is preferred that this second pre-determined size be two inches. It is further preferred that the separation be made in a manner to remove a substantial portion of any ash which may be attached to the ferrous or non-ferrous metals in stream 3. It is particularly preferred that this separation be made by the use of a trommel, or a vibrating bar system contained in a cascade type of separator design, that both removes the ash from the metals as well as separates stream 3 into two streams: third stream 6 and a fourth stream 7. Third stream 6 will consist essentially of components of dimensions greater than two inches which will be predominantly metal components. Fourth steam 7 will consist essentially of components of dimension less than two inches which will be predominantly ash and some metal components.

Third stream 6 is conveyed or otherwise transported to second stream 4 for further processing as described below.

Ferrous metal is then removed from fourth stream 7 by passing the stream through magnet means s, such as a tramp magnet. This results in a ferrous metal stream 9 which may contain some ash which has attached itself to the ferrous metal and a fifth stream 10 which consists primarily of ash and non-ferrous metals. The ferrous metal stream 9 is conveyed or otherwise transported to second stream 4 for further processing along with second stream 4.

Second stream 4, along with third stream 6 and ferrous metal stream 9 are conveyed, or otherwise transported to a means 11, such as a shredder, to reduce all components of the three streams to a third pre-determined size. A preferred third pre-determined size is four inches. It has been found that this size will result in the ability to recover a "free-from-ash" ferrous material having a density greater than 70 pounds/cubic foot. Such a product is very desireable for use in the production of steel, and has not been obtainable with other known prior art processes for treating municipal incinerated waste product. Thus sixth stream 12 is formed with substantially no metal components greater than four inches in any dimension and a density greater than 70 pounds/cubic foot.

In the event there are components in the second stream 4 which are too large to pass through shredder 11, a means 13, such as a by-pass opening in the conveyor transporting second stream 4 to shredder 11, can be provided which will allow the removal of such large items. Such items could include very large pieces of pipe, structural steel or large heavy metal solids.

Stream 12 is then treated, such as passing it through a magnetic drum separator 14, to form stream 15 consisting of ferrous metal which may still have some ash attached to the ferrous metal and seventh stream 14 consisting principally of non-ferrous metal and ash. To remove ash which might still be attached to the ferrous metal in stream 15, stream 15 is conveyed, or otherwise transported, to a second trommel 17 which is operated in a manner to remove a sufficient amount of ash to allow recovery of a "free-from-ash" ferrous metal. In a preferred embodiment trommel 17 will be operated in a manner to achieve a 70 pound/cubic foot plus density "free-from-ash" ferrous metal.

Seventh stream 16 is conveyed to fifth stream 10 which together are conveyed, or otherwise transported, to a screening means 18 capable of separating by a fourth pre-determined size the combined streams into eight stream 19 consisting of substantially only ash and into ninth stream 20 consisting of metals and larger sized ash particles. In a preferred embodiment the fourth pre-determined size is 0.375 inches. The determination of the fourth pre-determined size was made upon learning that 90% of the available non-ferrous metal is greater than ⅜ inches in dimensions. By making stream separations wherein material less than ⅜ inches in dimensions are removed, quicker recovery of the end products can be achieved. For example, in an existing plant processing 150 tons/hour of municipal incinerated waste products it takes approximately 80 machine hours to process the feedstock. However, if the ⅜ inch size is changed only slightly to 5/16 the machine hours doubles and only 5% additional recovery of non-ferrous metals is achieved. Thus substantial improvements in process efficiency can be achieved with proper sizing separation in the various stages of the process.

This separation can be achieved by various screening devices commercially available, but it is preferred to utilize separator devices such as disclosed in co-pending U.S. patent application Ser. No. 07/719,268, entitled "Screens for Use in Treating Incinerated Waste Material", and filed on Jun. 21, 1991 by Peter F. Prinz, one of the co-inventors herein, or in co-pending U.S. patent application Ser. No. 02/719,265 entitled "Cascading Screens for Use in Treating Incinerated Waste Material", and filed on Jun. 21, 1991 by Peter F. Prinz, one of the co-inventors herein.

Ninth stream is conveyed, or otherwise transported, to a second means 21 which reduces all components in the ninth stream 20 to components whose dimensions are less than a fifth pre-determined size. The fifth pre-determined size is preferably 2.5 inches. This tenth stream 22 is treated, such as passing through parallel tramp magnets 23, to remove any remaining ferrous metal. The eleventh stream 24 comprising non-ferrous metals and ash undergoes a final sizing separation that separates ash having dimensions less than 0.375 inches to form stream 26 comprising non-ferrous metals and other organic components having dimensions between 0.375 and 1.0 inches and a stream 27 comprising non-ferrous metals having dimensions between 1.0 and 2.5 inches. This final sizing separation can be achieved by various commercially available separating devices. It is preferred that a two stage screen means 25 be used.

If desired the stainless steel can be separated from the other organic material in stream 26. This can be done by hand or by such other known methods. Also if desired the non-ferrous metals in twelfth stream 16 can be separated from one another by the use of parallel eddy-current, non-ferrous magnet 28 or other similarly known devices. Typical metals that can be separated include titanium, zinc, manganese, aluminum and brass.

It is not uncommon that dust-sized ash particles are formed during the formation of the first ferrous metal stream 9, third stream 6, fourth stream 7, or during the crushing of the ninth stream 20. To prevent the escape of these dust-sized ash particles into the environment and to allow for their recovery a conventional scrubber means 29 is utilized to entrap the particles during their formation and agglomerate them for collection. Such conventional scrubber assemblies typically include a collection system for capturing the dust-sized particles and transporting them to an agglomeration unit. The collection system generally includes a vacuum assembly that sucks up the dust particles and transports them through ducts to the agglomeration unit where they are collected. Once the ash has been agglomerated it is transferred to a desired collection point.

There are of course other alternate embodiments which are obvious from the foregoing descriptions of the invention which are intended to be included within the scope of the invention as defined by the following claims.

What I claim is:

1. A method for treating a feedstock of incinerated waste material containing ferrous metals, non-ferrous metals and ash to produce a "free-from-ash" ferrous metal stream comprising:

(a) separating said feedstock to form:

(i) a first stream whose components each have dimensions which are less than a first pre-determined size, and
(ii) a second stream whose components each have dimensions which are greater than said first pre-determined size,
(b) conveying said first stream to a sizing means to form:
(i) a third stream whose components each have dimensions which are greater than a second pre-determined size, said second pre-determined size being less than said first pre-determined size, and
(ii) a fourth stream whose components each have dimensions which are less than said second pre-determined size,
(c) conveying said third stream to said second stream,
(d) removing ferrous metal from said fourth stream to form:
(i) a first ferrous metal stream, and
(ii) a fifth stream,
(e) conveying said first ferrous metal stream to said second stream,
(f) reducing said dimensions of said components in said second stream, said third stream and said first ferrous metal stream to form a sixth stream whose components each have dimensions less than a third pre-determined size, said third pre-determined size being less than said first pre-determined size,
(g) removing ferrous metal from said sixth stream to form a seventh stream comprising substantially non-ferrous metal and ash,
(h) conveying said seventh stream to said fifth stream,
(i) separating ash from the ferrous metal removed from said sixth stream to form "free-from-ash" ferrous metal,
(j) separating the combined fifth and seventh streams to form:
(i) an eighth stream whose components each have dimensions which are less than a fourth pre-determined size and are comprised substantially of ash, said fourth pre-determined size being less than said second pre-determined size, and
(ii) a ninths stream whose components each have dimensions which are greater than said third pre-determined size and less than said first pre-determined size,
(k) reducing said dimensions of said components in said ninth stream to form a tenth stream whose components each have dimensions which are less than a fifth pre-determined size, said fifth pre-determined size being less than said first pre-determined size, but greater than said third pre-determined size,
(l) removing any ferrous metal from said tenth stream to form an eleventh stream comprising non-ferrous metals and ash, and
(m) separating ash from said eleventh stream to form a twelfth stream comprising substantially non-ferrous metals.

2. A method according to claim 1 wherein material greater than a sixth pre-determined size are removed prior to crushing said second stream, said sixth pre-determined size being greater than said first pre-determined size.

3. A method according to claim 1 wherein dust-sized ash particles formed during the formation of said first ferrous metal stream are removed to a scrubber means to agglomerate them for collection.

4. A method according to claim 1 wherein dust-sized ash particles formed during the formation of said third stream and said fourth stream are removed to a scrubber means to agglomerate them for collection.

5. A method according to claim 1 wherein dust-sized particles formed during the crushing of said ninth stream are removed to a scrubber means to agglomerate them for collection.

6. A method according to claim 1 wherein dust-sized ash particles formed:
(a) during the formation of said first ferrous metal stream,
(b) during the formation of said third stream and said fourth stream, and
(c) during the crushing of said tenth stream are removed to a scrubber means to agglomerate them for collection.

7. A method according to claim 1 wherein said first pre-determined size is sufficient to separate a majority by weight of said ferrous metals into said second stream.

8. A method according to claim 7 wherein said first pre-determined size is six to ten inches.

9. A method according to claim 1 wherein said second pre-determined size is sufficient to cause a majority by weight of ash in said first stream to be included in said fourth stream.

10. A method according to claim 9 wherein said second pre-determined size is 1½ to 2 inches.

11. A method according to claim 1 wherein said fourth pre-determined size is 0.375 inches.

12. A method according to claim 1 wherein said fifth pre-determined size is sufficient to cause any ferrous metal in said tenth stream to become "free-of-ash" ferrous metal.

13. A method according to claim 12 wherein said fifth pre-determined size is 2.5 inches.

14. A method according to claim 1 wherein said third pre-determined size is sufficient to cause metal components in said sixth stream to have a density of at least 70 pounds/cubic foot.

15. A method according to claim 14 wherein said pre-determined size is four inches.

16. A method for treating a feedstock of incinerated waste material containing ferrous metals, non-ferrous metals and ash to produce a "free-from-ash" ferrous metal stream comprising:
(a) separating said feedstock to form:
(i) a first stream whose components each have dimensions which are less than a first pre-determined size, and
(ii) a second stream whose components each have dimensions which are greater than said first pre-determined size,
(b) conveying said first stream to a sizing means to form:
(i) a third stream whose components each have dimensions which are greater than a second pre-determined size, said second pre-determined size being less than said first pre-determined size, and
(ii) a fourth stream whose components each have dimensions which are less than said second pre-determined size,
(c) conveying said third stream to said second stream,
(d) removing ferrous metal from said fourth stream to form:
(i) a first ferrous metal stream, and (ii) a fifth stream,
(e) conveying said first ferrous metal stream to said second stream, (f) reducing said dimensions of said components in said second stream, said third stream and said first ferrous metal stream to form a sixth stream whose components each have dimensions less than a third pre-determined size, said third pre-determined size being less than said first pre-determined size, (g) removing ferrous metal from said sixth stream to form a seventh stream comprising substantially non-ferrous metal and ash, (h) conveying said seventh stream to said fifth stream, and (i) separating ash from the ferrous metal removed from said sixth stream to form "free-from-ash" ferrous metal.

* * * * *